J. L. DISNEY.
STEREOSCOPE.
APPLICATION FILED DEC. 18, 1917.
1,292,271.
Patented Jan. 21, 1919
3 SHEETS—SHEET 1.
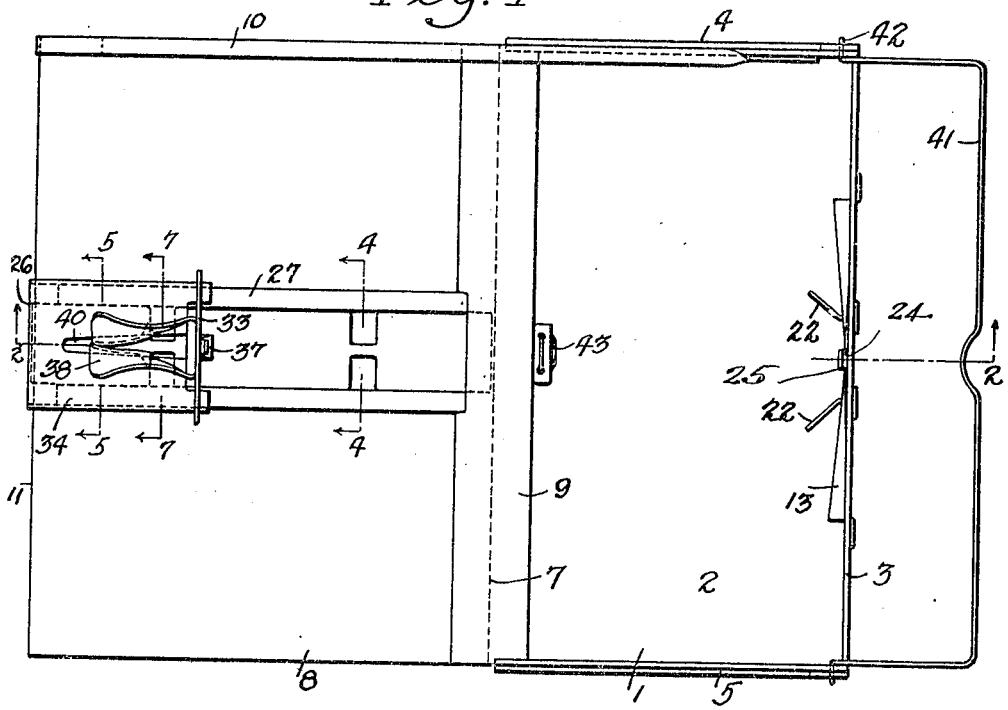
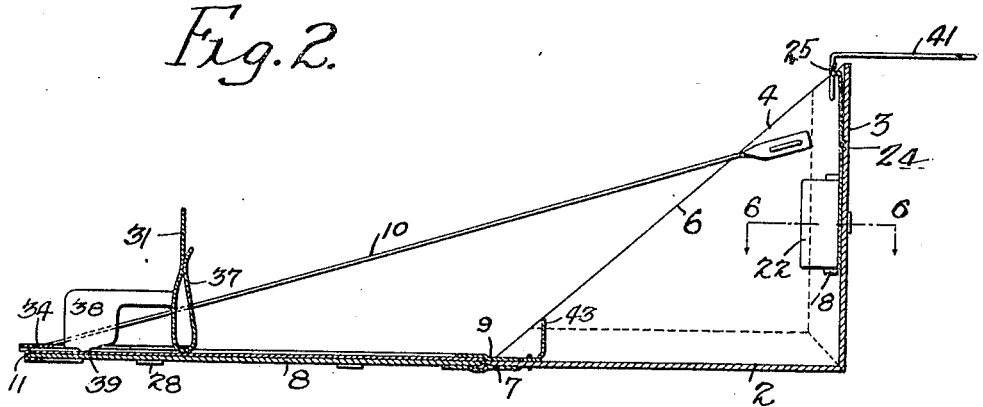
Witnesses,
M. A. Inglar.
E. E. Reichart
Inventor:
James L. Disney
By Joshua R. H. Potts
His Attorney

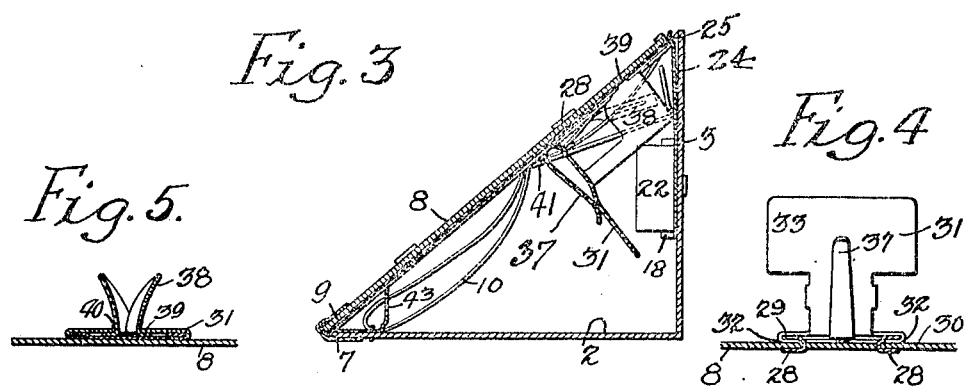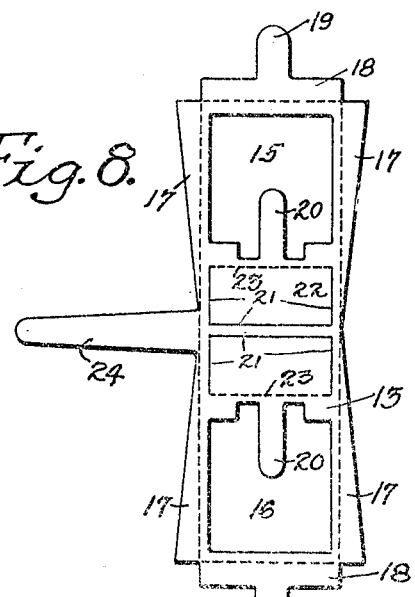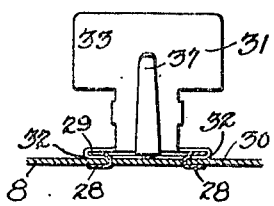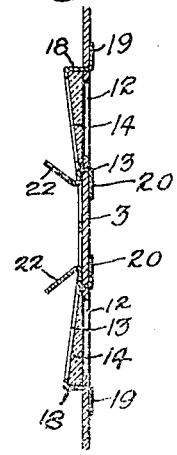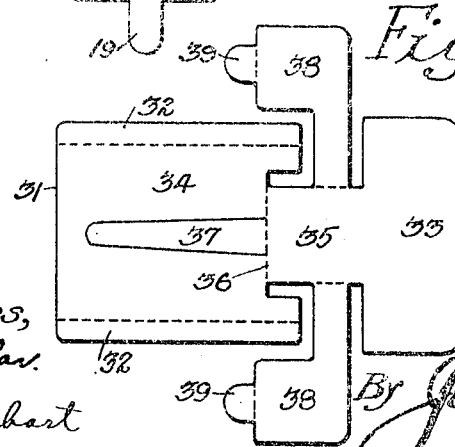

J. L. DISNEY.
STEREOSCOPE.
APPLICATION FILED DEC. 18, 1917.
1,292,271.
Patented Jan. 21, 1919.
3 SHEETS—SHEET 3.
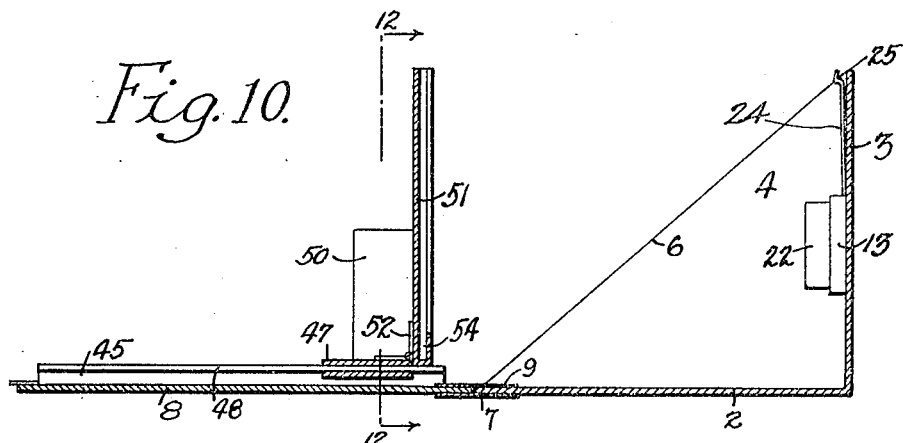
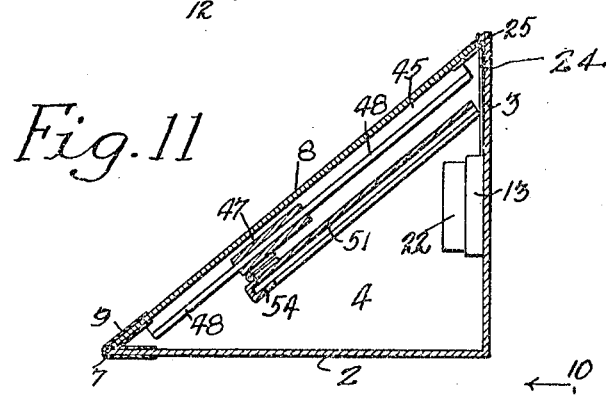
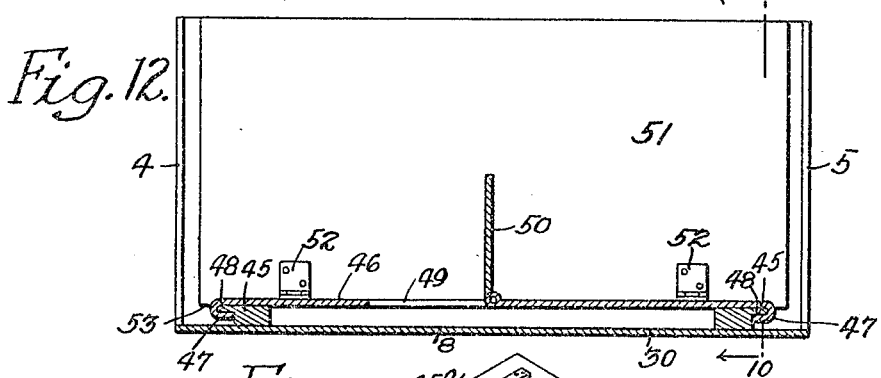
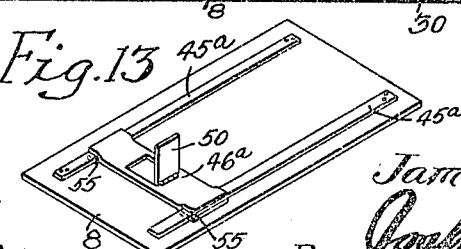
Witnesses,
M. A. Inglar.
E. E. Reichart.
Inventor,
James L. Disney
By Joshua R. H. Potts
his Attorney

UNITED STATES PATENT OFFICE.

JAMES LAMBERT DISNEY, OF PHILADELPHIA, PENNSYLVANIA.

STEREOSCOPE.

1,292,271.  Specification of Letters Patent.  Patented Jan. 21, 1919.

Application filed December 18, 1917.  Serial No. 207,657.

*To all whom it may concern:*

Be it known that I, JAMES LAMBERT DISNEY, a citizen of the United States, residing at Philadelphia, in the county of Philadelphia and State of Pennsylvania, have invented certain new and useful Improvements in Stereoscopes, of which the following is a specification.

One object of my invention is to provide a stereoscope which can be cheaply and quickly manufactured and can be conveniently used for practical and commercial purposes. For example, my improved stereoscope is well adapted for use by salesmen, manufacturers, and contractors, since by the aid of my improved stereoscope they can display actual photographs or other pictures of the articles they have for sale or have under consideration. The value of such display can be appreciated since it is well known that a photograph or picture viewed through a stereoscope has substantially the same appearance as the subject of which the picture is a representation. Thus with the use of my invention a salesman, for example, can be relieved of the burden of the articles which he has for sale and merely carry photographic pictures of the articles and submit the pictures for inspection, through the stereoscope, by prospective customers.

A further object is to so construct my improved stereoscope that when folded it will provide a box for inclosing the picture holder, the lens casing, an eye-spacing rest, and other elements which are necessary in the guiding of the picture holder.

These objects, and other advantageous ends which will be described hereinafter, I attain in the following manner, reference being had to the accompanying drawings in which—

Figure 1 is a top plan view of my improved stereoscope open and ready for use,

Fig. 2 is a sectional elevation taken on the line 2—2 of Fig. 1,

Fig. 3 is a sectional elevation taken on the line 2—2 of Fig. 1 when the stereoscope is closed or folded, Fig. 4 is a fragmentary sectional elevation taken on the line 4—4 of Fig. 1, Fig. 5 is a fragmentary sectional elevation taken on the line 5—5 of Fig. 1, Fig. 6 is a fragmentary sectional plan taken on the line 6—6 of Fig. 2, Fig. 7 is a fragmentary sectional elevation taken on the line 7—7 of Fig. 1, Fig. 8 is a view of a lens holder forming a part of the present invention and showing the same as it appears when cut from a flat sheet of metal or the like and before the same is bent into the positions shown in Figs. 1, 2, 3, and 6, Fig. 9 is a view of a picture holder which forms a part of my invention showing the same as it appears when cut from a piece of flat material, such as sheet metal or the like, and before the same is bent into the shapes illustrated in Figs. 1, 2, 3, 5, and 7, Fig. 10 is a sectional elevation of a slightly modified form of my invention in which I have illustrated a foldable picture holder, Fig. 11 is a sectional elevation showing the stereoscope of Fig. 10 in its closed condition, Fig. 12 is a section on the line 12—12 of Fig. 10, and Fig. 13 is a fragmentary perspective view showing a slight modification in the guiding means for the picture holder.

Referring to Figs. 1 to 9, inclusive, of the drawings, 1 is a box which can be made of cardboard or other sheet material and includes a base section 2 and an upright section 3 hereinafter termed the "lens section". The base section and the lens section are preferably made at right angles to each other, as clearly shown in Figs. 1 and 2. Two triangular end sections 4 and 5 are secured to the base section 2 and to the lens section 3 so that the long edges 6, which form the hypotenuse of each end section, extend between the top of the lens section 3 and the rear edge 7 of the base section 2.

A supplementary section 8 is hinged by flexible fabric or other means 9 to the rear edge 7 of the base section 2 and this section 8, when moved into the position shown in Fig. 2, forms a supplementary base which is positioned substantially in the same plane with the base section 2.

A flexible strap or tape 10 has its opposite ends connected to the supplementary base 8 and one of the end sections above mentioned. This tape serves to hold the supplementary base 8 in alinement with the base section 2, as above mentioned, and also permits the supplementary base 8 to hinge so as to be moved into a position to cover the space within the box 1 between the end sections 4 and 5, the top of the lens section 3, and the rear of the base section 2. When thus moved the supplementary base section 8 will be included in a plane which substantially includes the edges 6 of each of the triangular end sections 4 and 5, it being noted that the edges 6 of the end sections 4 and 5 are the longest edges of the triangular sections.

The depth of the supplementary base section 8 from its hinge 9 to its rear edge 11 is substantially equal to the direct distance between the rear edge 7 of the base section 2 and the top of the lens section 3; in other words, the supplementary base 8 is of a depth substantially equal to one of the edges 6 of the triangular end sections 4 and 5. Thus the box 1 is in the form of a hollow triangular prism when the supplementary base section 8 is turned on its hinge 9, as above described and as clearly illustrated in Fig. 3. By this construction the depth of the supplementary base section 8 is greater than either the width of the base section 2 or the height of the lens section 3. This is an extremely important feature of my invention, as will hereinafter be explained, since I utilize the supplementary base section 8 to support a picture holder and I thus secure a comparatively long movement for adjustment of the focus. Furthermore, the height of the lens section and the base section 2 can be made comparatively small since I secure sufficient room for adjustment of the picture holder toward and from the lenses which are mounted on the lens section 3, due to the particular arrangement and construction of the hollow prismatic box, as above described. For example, considering that the lens section 3 is three inches high, the base section 2 is four inches deep, then I can accommodate a supplementary base section 8 which is substantially five inches deep.

The lens section 3 has two observation holes 12 and a lens frame 13 is secured to the lens section 3 and serves primarily to support the lenses 14 (see Fig. 6). I preferably make the lens frame 13 by cutting it from a sheet of metal, as shown in Fig. 8. The blank in this form includes two openings 15 and 16, side flaps 17, and end flaps 18. The end flaps have lips 19 and these lips together with other lips 20 are adapted to pierce the lens section 3 when the flaps and side flaps are bent into the position shown in Fig. 6. The lips 19 and 20 can be readily turned over in engagement with the outer surface of the lens section 3 and thereby secure the lens frame 13 to the lens section 3.

The central portion of the lens frame is cut along the full lines 21, as shown in Fig. 8, to form two shutters or septums 22 when bent along lines indicated by the dotted lines 23. Figs. 1, 2, and 6 show these septums bent into their operative positions.

The lens frame 13 has a tongue 24 which extends upwardly and this tongue is preferably hooked at its upper end, as shown at 25. This hook 25 is so positioned as to be capable of engaging the outer end 26 of a slideway or rail 27, which is secured to the supplementary base 8, when the latter is moved into the position shown in Fig. 3. The rail 27 has lips 28 which pierce the supplementary base 8 and are turned over the outer surface of the supplementary base, as clearly shown in Fig. 4.

The oppositely disposed edges 29 of the rail 27 are spaced above the surface 30 of the supplementary base 8 to permit a picture holder 31 to slide thereon. The picture holder 31 is preferably stamped out of sheet metal in a flat state, as shown in Fig. 9, and has two edge portions 32 which are adapted to be bent around the edges 29 of the rail 27. A head section 33 is connected with the slide section 34 of the picture holder 31 by a comparatively narrow neck 35. This neck 35 is adapted to be bent into an upright position with respect to the slide section 34, the bending taking place substantially on the dotted line 36 (see Fig. 9).

A picture retaining finger 37 is provided by cutting the material, as shown in Fig. 9, and bending this finger downwardly and then upwardly in front of the neck 35 and head 33 (see Figs. 1, 2, and 4).

Lateral extensions 38 project from the neck 35 and have lips 39 which are designed to extend through the opening 40 provided by bending the finger 37, as above described. These lips 39, by being bent at an angle under the slide section 34, serve as anchors for the extensions 38, said anchors providing a handle whereby the picture holder 31 can be slid along the rail 27.

An eye-spacing rest 41 is in the form of a wire frame or yoke which has its opposite ends 42 pivotally mounted in the triangular end sections 4 and 5. When in the position shown in Figs. 1 and 2, this eye-spacing rest serves as a limiting means to prevent the eyes of an observer from too closely approaching the lenses and at the same time forms a support or rest for the forehead while pictures, which are being displayed, are being observed through the lenses.

When not desired for use, this eye-spacing rest can be turned on its pivoted ends 42 within the box, as clearly shown in Fig. 3.

A small standard 43 is supported on the base section 2 and is preferably made of resilient material so as to form a backing for engagement with the rail 27 and I thus secure tension which both serves as a buffing means for and also holds the supplementary base when in its folded position, against rattling or undesirable movement.

It will, of course, be understood that the pictures to be viewed can be inserted between the finger 37 and the head 33 of the picture holder 31 and the picture holder may be slid along the rail 27 to secure the proper focus, as in other stereoscopes.

In the form of my invention illustrated in Figs. 10 to 12, inclusive, I have shown a modification in the form of the picture holder and in these latter mentioned figures I provide rails 45 spaced apart and a slidable carriage 46 having turned ends 47 adapted to engage under flanges 48 of said rails. The carriage 46 has an opening 49 and a standard 50 is hinged to the carriage 46 adjacent the opening so that said standard can be moved downwardly into said opening or it can be moved into the upright position as shown in Figs. 10 and 12.

A picture holder 51 is hinged at 52 to the carriage 46 and has an edge 53 which will engage the tops of the rails 45 when in its raised position, as shown in Figs. 10 and 12. The standard 50 can be moved into an upright position and forms a backing and support for the picture holder, the latter being grooved around its forward edge, as shown at 54, to form a support for the picture. This picture holder 51 can be folded rearwardly on the carriage 46 and will be contained within the box when the latter is closed. In all other respects the parts illustrated in Figs. 10 to 12 are similar to those described in connection with Figs. 1 to 9, inclusive, and I have given similar parts corresponding reference numerals.

It will be understood that the rails 45 in the above described modification will be secured to the surface 30 of the supplementary base 8.

In Fig. 13 I have shown rails 45ª which can be made in the form of strips of flexible tape, leather, or the like, the opposite ends of the strips being secured to the supplementary base section 8. In this instance I preferably provide a carriage 46ª having its opposite ends forked, as shown at 55, for embracing the strips 45ª which form the rails. In all other respects the construction is similar to the form of my invention illustrated in Figs. 10 to 12, inclusive, and I have, therefore, given similar parts corresponding reference numerals.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A stereoscope including a base section; a lens section secured in upright position relatively to said base section; a supplementary base section hinged to said base at a position remote from the junction of the lens section with the base section, said supplementary base section being movable into a position in which it will be substantially included in the same plane with the base section, said supplementary section also being movable on its hinge into a position extending at an incline from the base section toward the top of the lens section; and a picture holder supported on said supplementary base and adapted to be moved into the space between the lens section, said base section, and said supplementary base section when the latter is in said inclined position, substantially as described.

2. A stereoscope including a base section; a lens section secured in upright position relatively to said base section; a supplementary base section hinged to said base at a position remote from the junction of the lens section with the base section, said supplementary base section being movable into a position in which it will be substantially included in the same plane with the base section, said supplementary section also being movable on its hinge into a position extending at an incline from the base section toward the top of the lens section; a picture holder supported on said supplementary base and adapted to be moved into the space between the lens section, said base section, and said supplementary base section when the latter is in said inclined position; and means for securing said supplementary base against accidental movement from its inclined position, substantially as described.

3. A stereoscope including a box having a base section; a lens section; two triangular end sections fitting between the base section and the lens section; a supplementary base hinged to said base section at a point remote from said lens section and having an opposite edge surface adapted to be moved into a position adjacent the top of the lens section; and a picture holder mounted on said supplementary base and adapted to be positioned between the triangular end sections, the lens section, said base section, and said supplementary base when the latter is moved into said position, substantially as described.

4. A stereoscope including a box having a base section; a lens section; two triangular end sections fitting between the base section and the lens section; a supplementary base hinged to said base section at a point remote from said lens section and having an opposite edge surface adapted to be moved into a position adjacent the top of the lens section; a picture holder mounted on said supplementary base and adapted to be positioned between the triangular end sections, the lens section, said base section, and said supplementary base when the latter is moved into said position; and means for securing said supplementary base in said moved position, substantially as described.

5. A stereoscope including a box having a base section; a lens section; two triangular end sections fitting between the base section and the lens section; a supplementary base hinged to said base section at a point remote from said lens section and having an opposite edge surface adapted to be moved into a position adjacent the top of the lens section; a picture holder mounted on said supplementary base and adapted to be positioned between the triangular end sections, the lens section, said base section, and said supplementary base when the latter is moved into said position; a tongue supported by said lens section and having a hooked end; and means on said supplementary base for engagement with the hook of said tongue to secure the supplementary base in said position, substantially as described.

6. A stereoscope including a lens section having lens holes therein; and a lens frame made of sheet material having openings for alinement with said holes, said frame having bent flaps thereon which have outer edges extending at a slant and in engagement with said lens section for housing the top and bottom edges of the lenses, said frame having integral vision septums bent therefrom and extending forwardly from said openings, said septums being provided by cuts in the frame to permit the septums to be bent outwardly, substantially as described.

7. A stereoscope including a box having a movable section; and a sheet metal lens frame mounted on said box and having an integral securing tongue thereon including a hook for engagement with a part on said movable section to secure the latter against accidental movement, substantially as described.

8. A stereoscope including a box having a front lens section therein; and an eye-spacing rest pivotally mounted on the box and movable into and out of the box by being swung over the edge of said lens section, substantially as described.

9. A stereoscope including a rail; a picture holder made of sheet material bent into form, said picture holder including a base; a head bent at an upright position; a finger cut from said base and bent adjacent said head; a neck portion; and lateral extensions on said neck portion and having lips bent into the opening produced by the formation of said finger, substantially as described.

10. A stereoscope including a base section; a lens section; a supplementary base section, said supplementary base section normally forming a triangular structure with the lens section and base section, said supplementary base section being movable to lie in the plane of the base section; and a picture holder movably mounted on the supplementary base section and adapted to be moved into the space between the lens section, said base section, and said supplementary base section when said sections are in the position to form said triangular structure, substantially as described.

11. A stereoscope including a base section; a lens section secured in upright position relatively to said base section; a supplementary base section movably secured to said base at a position remote from the junction of the lens section with the base section, said supplementary base section being movable into a position in which it will be substantially included in the same plane with the base section, said supplementary base section also being movable into a position extending at an incline from the base section toward the top of the lens section; a picture holder supported on said supplementary base and adapted to be moved into the space between the lens section, said base section, and said supplementary base section when the latter is in said inclined position, and means for supporting said supplementary base section in said position in which it is included in the same plane with the base section, substantially as described.

In testimony whereof I have signed my name to this specification in the presence of two subscribing witnesses.

JAMES LAMBERT DISNEY.

Witnesses:
MARY A. INGLAR,
CHAS. E. POTTS.

Copies of this patent may be obtained for five cents each, by addressing the "Commissioner of Patents, Washington, D. C."